(12) United States Patent
Johnson (10) Patent No.: US 8,230,972 B2
(45) Date of Patent: Jul. 31, 2012

(54) TREE STAND

(76) Inventor: Jeremy Johnson, Cortland, NE (US)

( * ) Notice: Subject to any disclaimer, the term of this patent is extended or adjusted under 35 U.S.C. 154(b) by 216 days.

(21) Appl. No.: 12/803,066

(22) Filed: Jun. 18, 2010

(65) Prior Publication Data

US 2011/0308887 A1 Dec. 22, 2011

(51) Int. Cl.
E04G 3/24 (2006.01)

(52) U.S. Cl. .................................................. 182/187

(58) Field of Classification Search .................. 182/187, 182/188
See application file for complete search history.

(56) References Cited

U.S. PATENT DOCUMENTS

| | | | |
|---|---|---|---|
| 4,730,699 A * | 3/1988 | Threlkeld | 182/187 |
| 5,482,137 A * | 1/1996 | McNeill | 182/187 |
| 5,695,099 A * | 12/1997 | Strum | 224/155 |
| 5,842,540 A | 12/1998 | Mancini, Jr. | |
| 6,102,158 A * | 8/2000 | Winschel | 182/187 |
| 6,571,916 B1 | 6/2003 | Swanson | |
| RE39,725 E | 7/2007 | Muhich | |
| 7,246,683 B2 * | 7/2007 | Pringnitz | 182/187 |
| 2003/0192741 A1 * | 10/2003 | Berkbuegler | 182/187 |
| 2006/0196726 A1 | 9/2006 | Pestrue | |
| 2007/0151803 A1 | 7/2007 | D'Acquisto | |
| 2007/0261919 A1 | 11/2007 | Roe | |
| 2009/0321186 A1 * | 12/2009 | Louchart | 182/188 |

* cited by examiner

*Primary Examiner* — Charles A Fox
*Assistant Examiner* — Kristine Florio
(74) *Attorney, Agent, or Firm* — Dennis L. Thomte; Thomte Patent Law Office LLC (57) ABSTRACT

A tree stand including a first support secured to the tree and which has a platform secured thereto which may be adjustably positioned with respect to the first support to compensate for variously angled tree trunks or branches. A seat assembly is rotatably mounted on the platform so as to be movable 360° with respect to the platform.

6 Claims, 9 Drawing Sheets

TREE STAND

BACKGROUND OF THE INVENTION

1. Field of the Invention

This invention relates to a tree stand and more particularly to a tree stand which may be mounted on trees which are not straight but which may be angled in one or more directions. Further, this invention relates to a tree stand having a seat which may be rotated 360° with respect to the platform of the tree stand.

2. Description of the Related Art

Many types of hunting tree stands for use in hunting have been previously provided but they suffer from one or more problems. First, most conventional tree stands must be placed on a tree which is fairly straight which prevents their use on trees which are not straight but which are angled. Second, the seats of the conventional tree stands are not rotatable 360° with respect to the platforms thereof which requires the hunter to shift his/her body on the fixed seat for different shots with that shifting possibly creating noise which will spook the approaching animal. Third, the platforms on conventional tree stands which include seats thereon, do not provide adequate space for the hunter should the hunter desire to stand rather than sit. Fourth, conventional tree stands do not provide the hunter with adequate room to assume a shooting position whether the hunter is rifle hunting or bow hunting.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A tree stand is disclosed which comprises a generally rectangular first support having an upper end, a lower end, a first side edge, a second side edge, an inner side and an outer side. Means is provided for attaching the first support to a tree trunk whereby the inner side of the first support is positioned adjacent the tree trunk. One way of attaching the first support to the tree is by wrapping a pair of straps, which are attached to the first support, around the tree. Another way of attaching the first support to the tree is to extend lag bolts or the like through openings in the first support into the tree. A pivot member in the form of a threaded stud bolt is secured to the first support which extends transversely outwardly from the outer side of the first support. A second support is positioned at the outer side of the first support which is selectively pivotally or rotatably mounted on the stud bolt. A nut is threaded onto the stud bolt to maintain the second support on the first support. In the preferred embodiment, the second support is generally disc-shaped and which has at least a pair of elongated arcuate slots formed therein with the first support having a pair of spaced-apart bolt members secured thereto which extend therefrom into the slots of the second support for selectively positioning the second support in various positions with respect to the first support to compensate for different side-to-side tree trunk angles. A platform is selectively pivotally secured to the second support about an axis which is transverse to the stud bolt. A length adjustable connector member is secured to and extends between the platform and the first support for selectively positioning the platform in a generally horizontally disposed position. The length adjustable connector permits the platform to be selectively positioned in a generally horizontally disposed position regardless of the fore and aft angle of the tree trunk. An elongated, upstanding seat support is provided having upper and lower ends. The upper end of the seat support is laterally offset with respect to the lower end thereof. The seat support is selectively rotatably secured at its lower end to the platform and extends upwardly therefrom. A seat is secured to the upper end of the third support. In the preferred embodiment, the seat support is selectively vertically adjustably secured to the platform.

It is therefore a principal object of the invention to provide an improved tree stand.

A further object of the invention is to provide a tree stand which may be placed on trees which are not straight but which may have trunks which lean from side to side or fore and aft and any combination thereof.

A further object of the invention is to provide a tree stand which has a rotatable seat assembly mounted thereon which may be rotated 360° with respect to the platform of the tree stand.

A further object of the invention is to provide a tree stand including a platform which is sized to provide adequate room for the hunter.

A further object of the invention is to provide a tree stand having a unique seat arrangement so that the hunter will have adequate room to stand on the platform rather than sitting on the seat.

A further object of the invention is to provide a tree stand which is quickly and safely secured to a tree.

A further object of the invention is to provide a tree stand which is safe to use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

With respect to the description of the tree stand and the tree on which the tree stand is to be placed, the tree trunk and tree stand will be described as one faces the tree trunk from the side on which the tree stand is to be placed. As used herein, the term "fore and aft angle" will refer to the angle of the tree trunk with respect to the side of the tree trunk on which the tree stand will be placed. In other words, if the tree trunk is leaning towards the side on which the tree stand is to be placed, that would be a "fore" angle. Conversely, if the tree trunk is leaning away from the side on which the tree stand is to be placed, that would be an "aft" angle.

As used herein, the term "side-to-side angle" will refer to the angle of the tree trunk as viewed from the side of the tree trunk on which the tree stand is positioned. In other words, if the tree trunk is leaning to the left with respect to the side on which the tree stand is to be placed, that would be a left side leaning tree trunk. Conversely, if the tree trunk is leaning to the right with respect to the side on which the tree stand is to be placed, that would be a right side leaning tree.

The tree stand of FIGS. 1-7 is designated by the reference numeral 10 and generally includes a mounting base 12, platform 14 and seat assembly 16. The stand 10 is designed to be positioned on the trunk or large limb of a tree regardless of whether the trunk or limb is perfectly vertical. The stand may be easily and safely mounted on a tree which leans to the left, leans to the right, leans forwardly, leans rearwardly or any combination thereof. For purposes of description, the tree stand 10 will be described as a person would view the same facing the side of the tree upon which the tree stand is to be placed.

Figure 1:
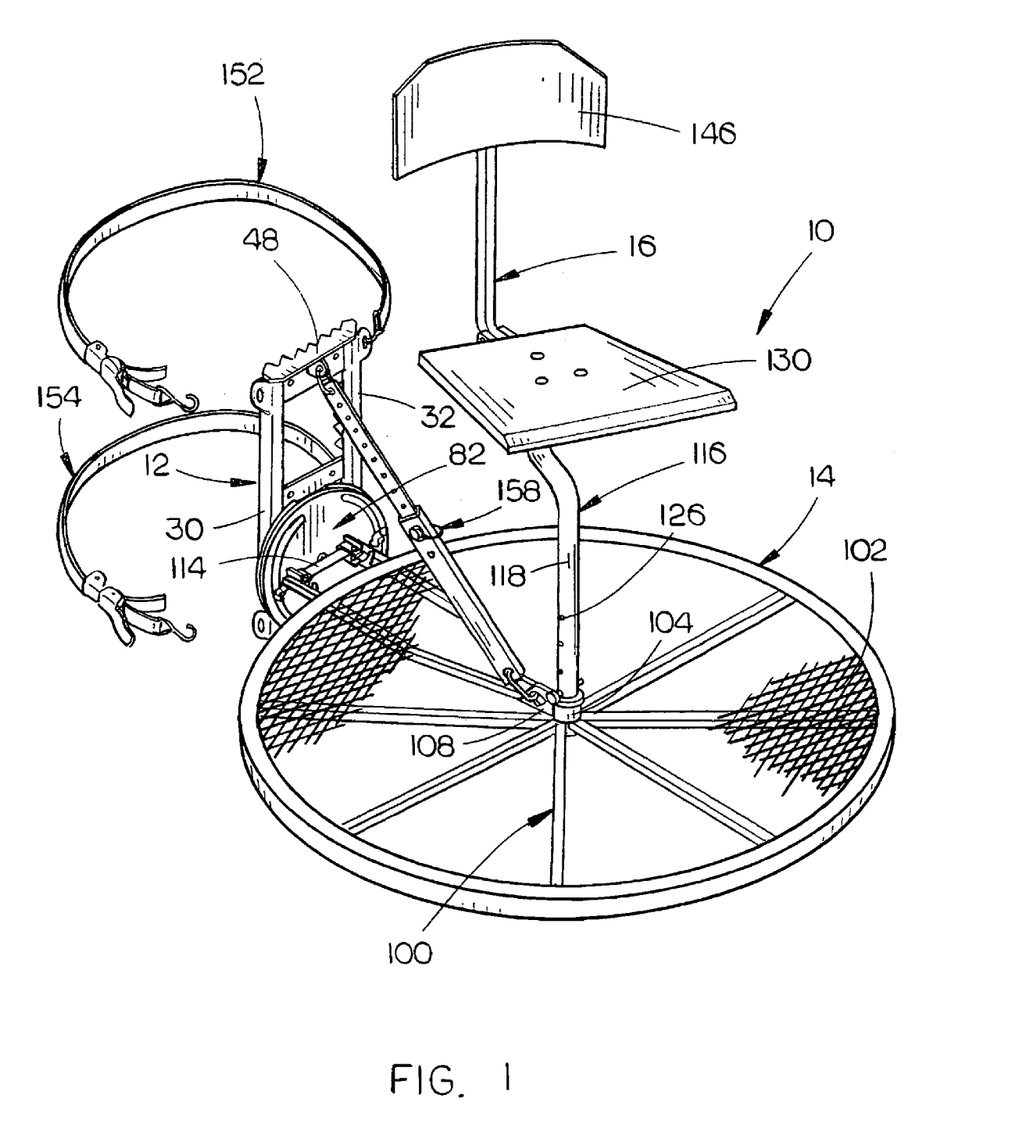
FIG. 1 is a perspective view of the tree stand of this invention.
Figure 2:
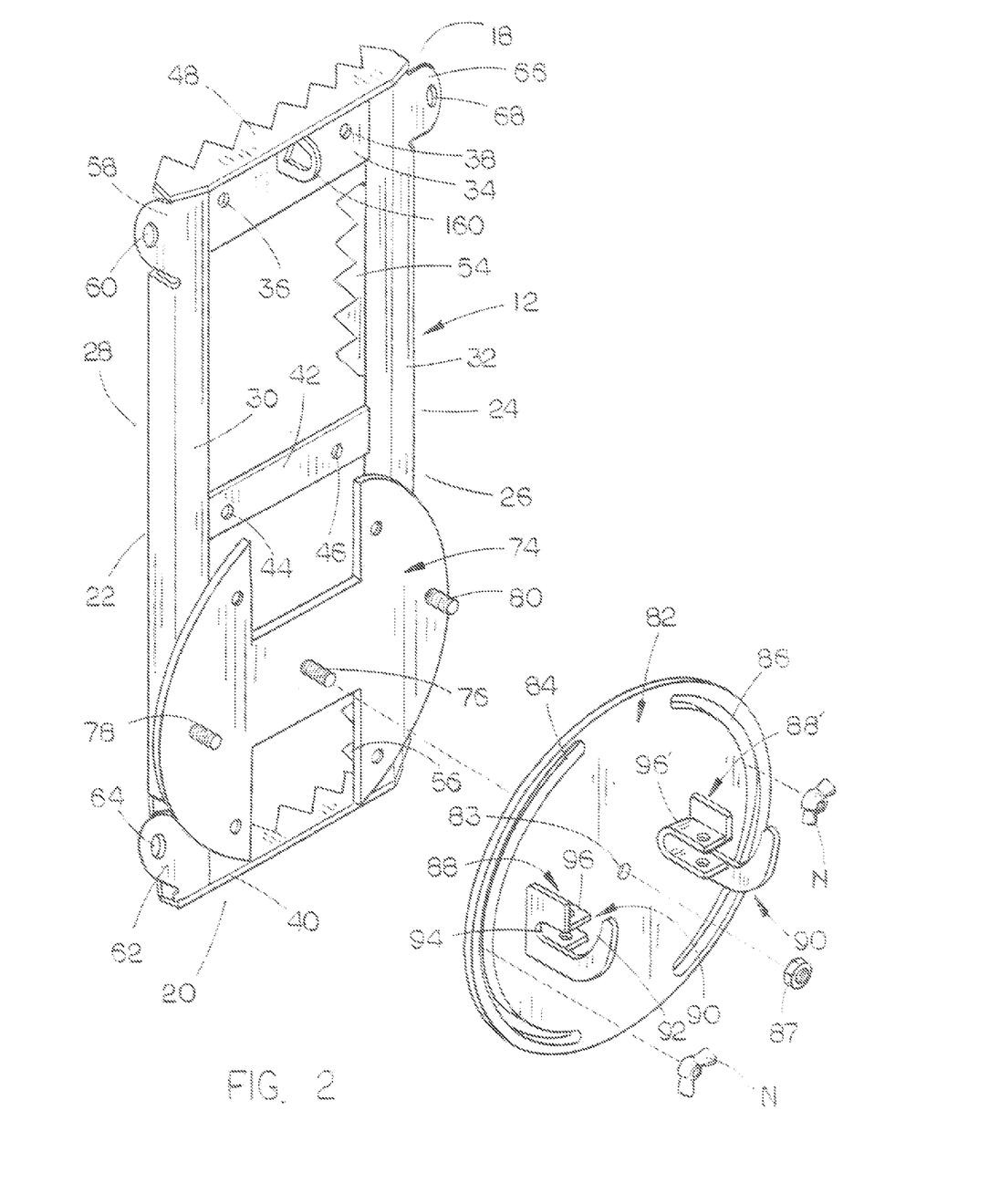
FIG. 2 is an exploded perspective view of a portion of the tree stand of FIG. 1.
Figure 3:
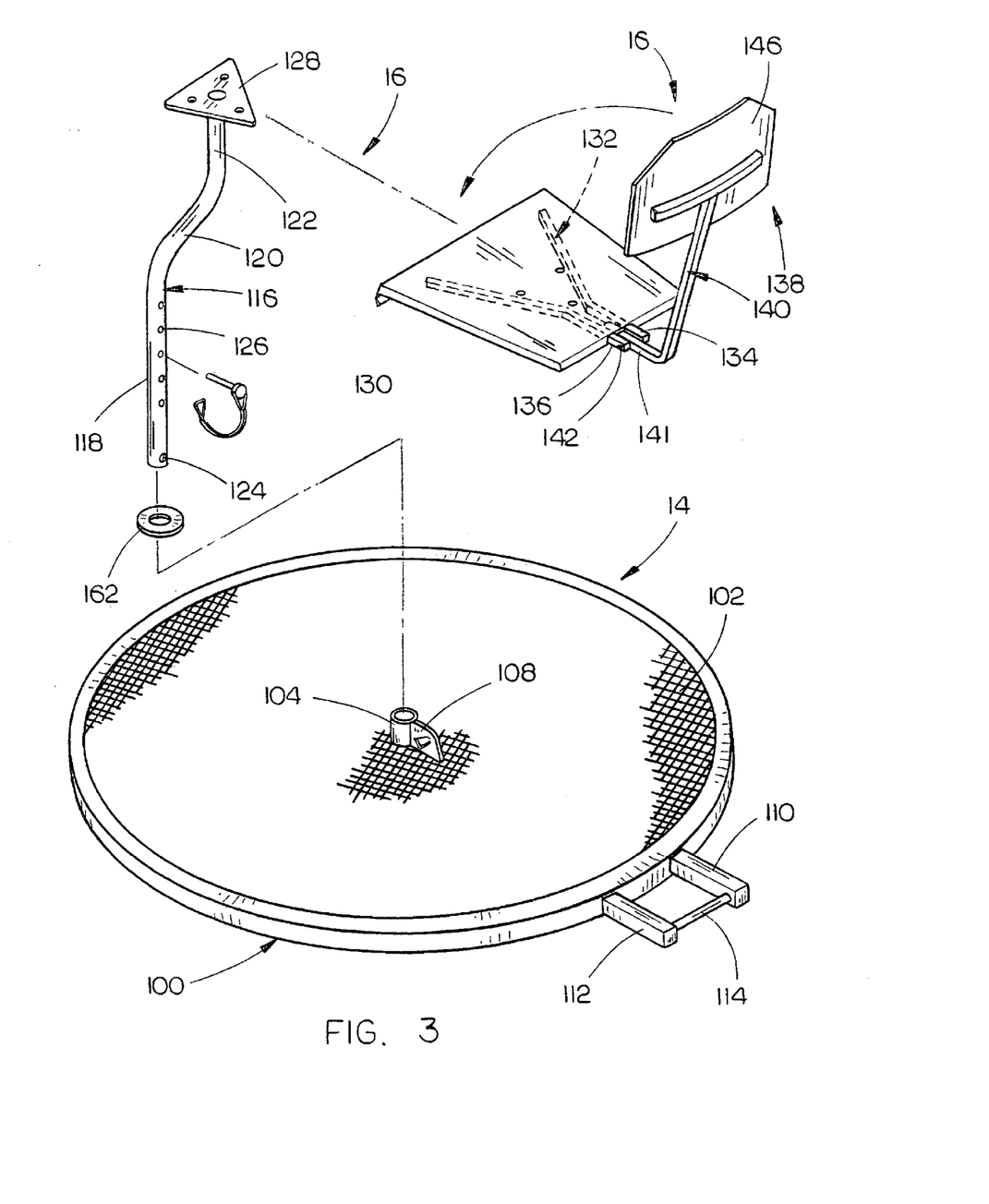
FIG. 3 is an exploded perspective view of a portion of the tree stand of FIG. 1.

Mounting base 12 generally includes an upper end 18, lower end 20, left side 22, right side 24, inner side 26 and outer side 28. More specifically, mounting base 12 includes an upstanding horizontally spaced-apart frame members 30 and 32. A vertically disposed plate 34 extends between the upper ends of frame members 30 and 32 and has a pair of openings 36 and 38 formed therein. A horizontally disposed plate 40 extends between the lower ends of frame members 30 and 32. Brace 42 extends between frame members 30 and 32 intermediate the ends thereof and has openings 44 and 46 formed therein. A horizontally disposed toothed plate 48 extends between the upper ends of frame members 30 and 32 with the teeth thereof facing inwardly for engagement with the tree. A row of inwardly facing teeth 50 extend from frame member 30 below the upper end thereof. A row of inwardly facing teeth 52 extend from frame member 30 at the lower end thereof. A row of inwardly facing teeth 54 extend from frame member 32 below the upper end thereof. A row of inwardly facing teeth 56 extend from frame member 32 at the lower end thereof.

Ear 58 extends laterally from the upper end of frame member 30 and has an opening 60 formed therein. Ear 62 extends laterally from the lower end of frame member 30 and has an opening 64 formed therein. Ear 66 extends laterally from the upper end of frame member 32 and has an opening 68 formed therein. Ear 70 extends laterally from the lower end of frame member 32 and has an opening 72 formed therein.

Disc 74 is welded to the outer side of frame members 30 and 32 at the lower ends thereof. An externally threaded pivot member or stud 76 is welded to the center of disc 74 and extends outwardly therefrom. A pair of spaced-apart, externally threaded studs 78 and 80 are welded to disc 74 on opposite sides of stud 76 and extend outwardly therefrom.

The numeral 82 refers to a disc-shaped support plate having a central opening 83 which receives stud 76. Support plate 82 also has a pair of oppositely disposed arcuate slots 84 and 86 formed therein which receive the studs 78 and 80 respectively. A nut 87 is threaded onto stud 76 to hold support plate 82 in position outwardly of disc 74. Stud 76 provides a pivot for support plate 82 so that support plate 82 may be pivoted or rotatably moved with respect to disc 74. Nuts N are threaded onto the outer ends of studs 78 and 80 to maintain support plate 82 in various rotational positions with respect to disc 74.

Support hooks or brackets 88 and 88' are welded to the outer side of support plate 82 and extend transversely therefrom. Inasmuch as support hooks 88 and 88' are identical, only hook 88 will be described in detail with "'" indicating identical structure on hook support 88'.

Hook support 88 has a slot 90 formed therein which includes a generally vertically disposed slot portion 92 and or generally horizontally disposed slot portion 94. Receiver 96 is welded to one side of hook support 88 with its open outer end registering with slot 90. Retaining pin 98 may be selectively removably extended through openings formed in the outer ends of the legs of receiver 96.

Platform 14 is preferably circular in shape and includes a framework 100 which has an expanded metal floor 102 positioned thereon. A vertically disposed hollow tube or collar 104 is welded to the center of the framework 100 so that the upper end of tube 104 is positioned above floor 102 and so that the lower end of tube 104 is positioned below the floor 102. Eyelet 108 is welded to tube 104 and framework 100 as seen in the drawings. Framework 100 includes a pair of spaced-apart frame members 110 and 112 having end portions which protrude outwardly of platform 14. Shaft 114 is secured to the outer ends of frame members 110 and 112 and extends therebetween.

The numeral 116 refers to a seat support post 116 having a lower end portion, an intermediate angled portion 120 and an upper end portion 122 which is offset with respect to lower end portion 118. An opening 124 is formed in the lower end of post 116 and a plurality of vertically spaced-apart openings 126 are provided in post 116 above opening 124. A horizontally disposed flat plate 128 is welded to the upper end of upper end portion 122 of post 116.

Seat assembly 16 includes a horizontally disposed and trapezoidal shaped seat portion 130 which is bolted to plate 128. Seat portion 130 includes a framework 132 having a pair of rearwardly protruding frame portions 134 and 136. Seat assembly 16 also includes a backrest 138 including a generally L-shaped support post 140 having a lower end portion 141 which is pivotally secured to frame portions 134 and 136 by bolt or pin 142. A stop plate 144 (not shown) is welded to the lower end of lower end portion 141 which engages the framework 132 to limit the pivotal movement of support post 140 with respect to seat portion 130. A curved back support 146 is secured to the upper end portion 148 of post 140. Back support 146 and seat portion 130 are padded for comfort.

Figure 5:
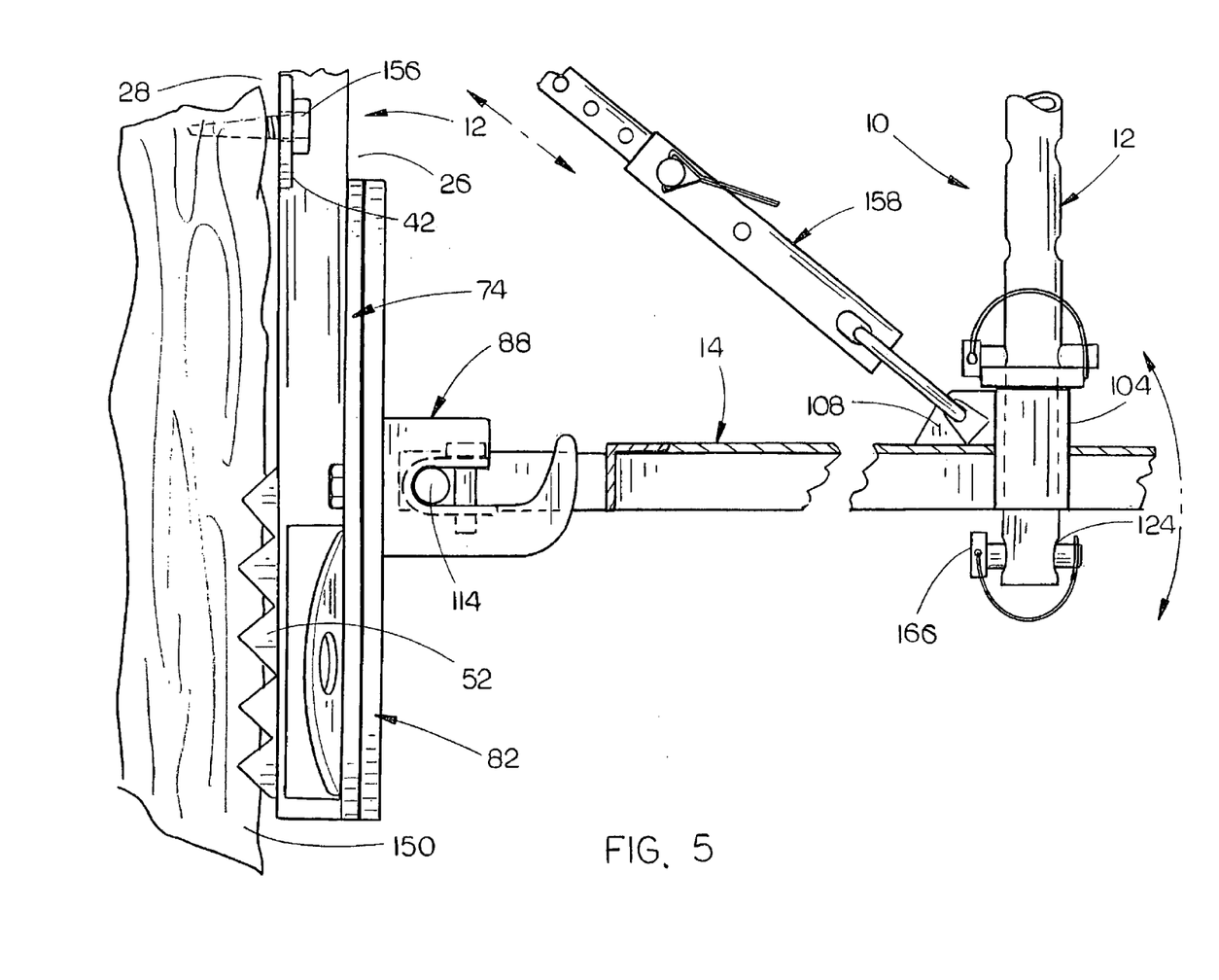
FIG. 5 is a partial side view of the tree stand of FIG. 1 attached to a tree.
Figure 6:
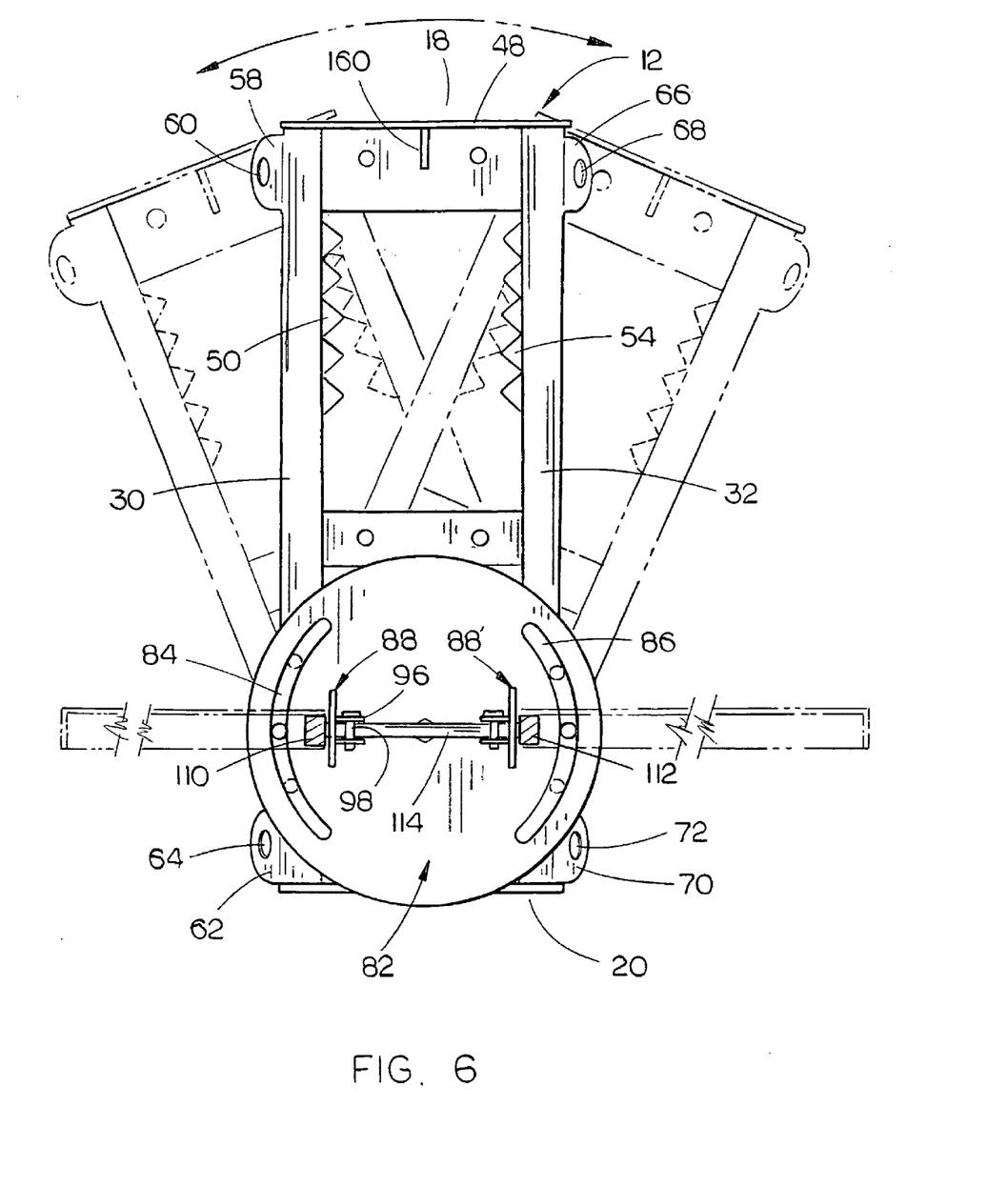
FIG. 6 is a frontal view of a portion of the tree stand of FIG. 1.

When it is desired to secure the tree stand 10 to a tree 150, the mounting base 12 is placed against the tree and secured thereto by an upper strap assembly 152 and a lower strap assembly 154 which are of the ratchet type straps. The hooks of the upper strap assembly 152 are secured to ears 58 and 66 of mounting base 12 and the hooks of the lower strap assembly are secured to ears 62 and 70 of mounting base 12. As seen in FIG. 5, the mounting base 12 may also be secured to tree 150 by a plurality of lag bolts or screws 156. The lag bolts or screws are extended through the openings 36, 38, 44 and 46 in mounting base 12. When the mounting base 12 is securely attached to the tree 150, the various rows of teeth will penetrate into the tree 150 to aid in preventing any movement of mounting base 12 with respect to three 150.

Figure 4:
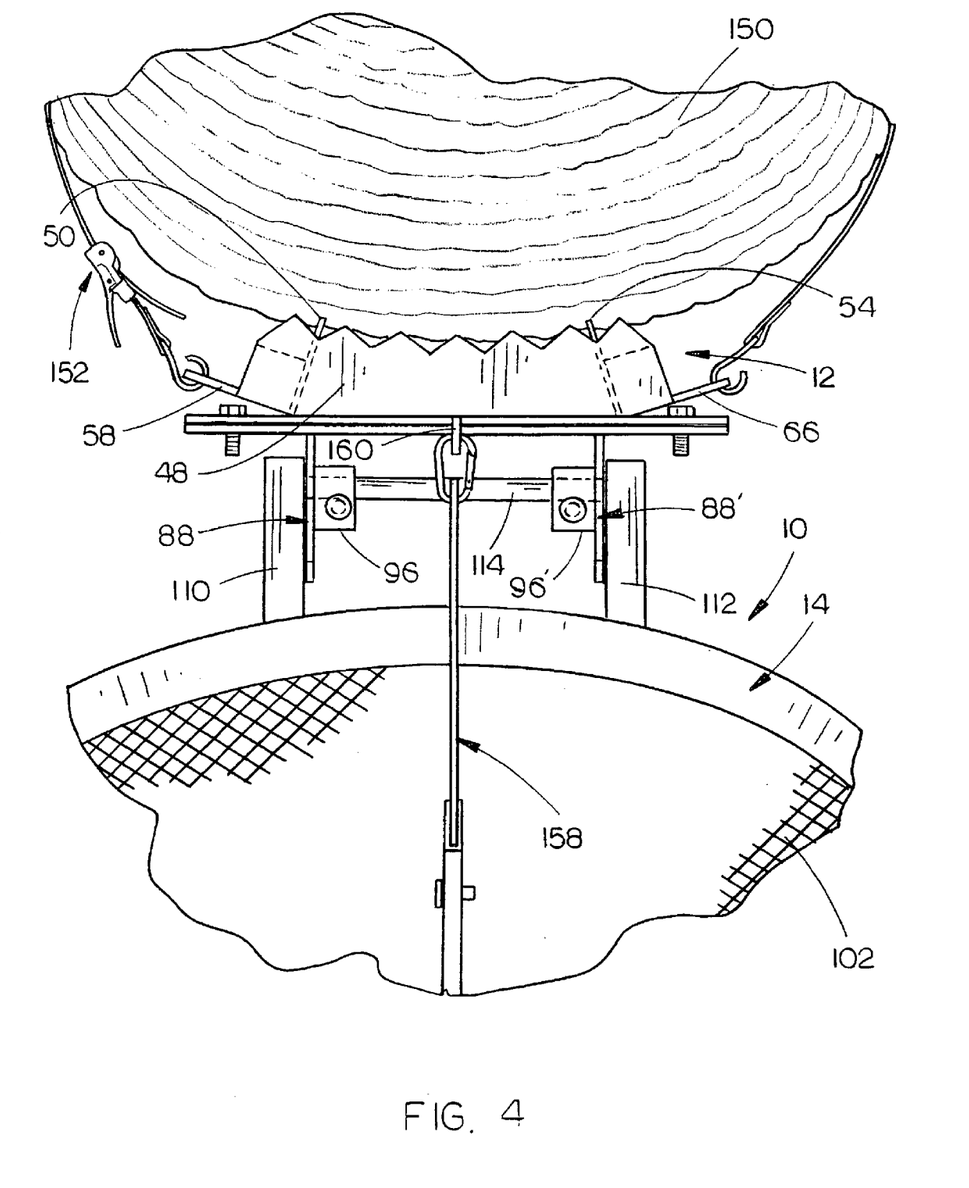
FIG. 4 is a partial plan view of the tree stand of FIG. 1 attached to a tree.

If the tree 150 is leaning sideways, the nuts N are loosened and support plate 82 is rotated with respect to disc 74 until the hook supports 88 and 88' are substantially in the same horizontal plane.

If not already previously done, the shaft 114 is inserted into the upper ends of slots 90 and 90' and then moved into the inner ends of the horizontally disposed slot portions 94 and 94'. Retaining pins 98 are then extended through the openings formed in the outer ends of the receivers 96 and 96'. A length adjustable member 158 is then secured to eyelet 108 and to eyelet 160 which is secured to plate 34. The member 158 is then length adjusted until the platform 14 is horizontally disposed. If the tree 150 is leaning in an aft manner, the member 158 will be lengthened. If the tree 150 is leaning in a fore manner, the member 158 will be shortened.

Figure 7:
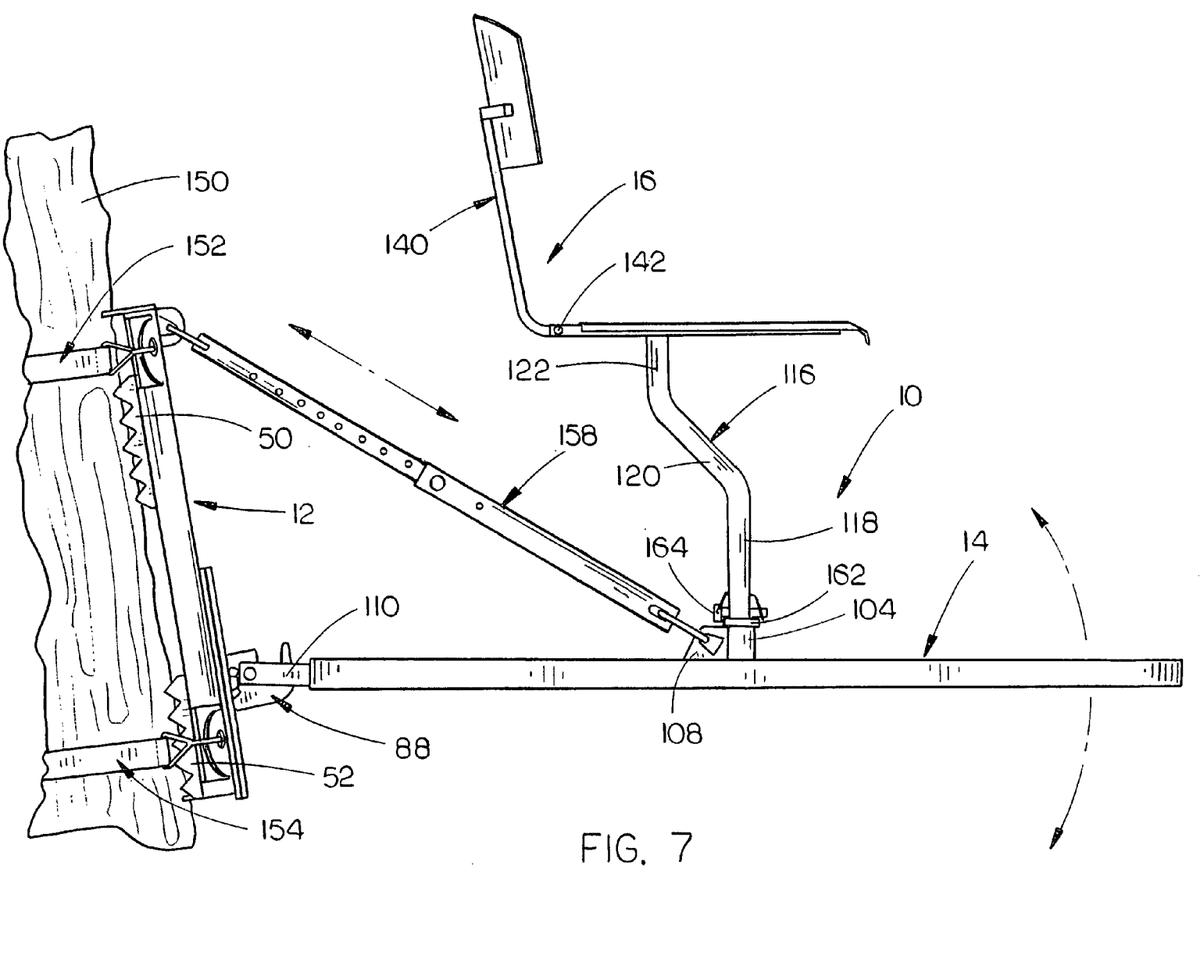
FIG. 7 is a side view illustrating the manner in which the tree stand of FIG. 1 may be adjusted to compensate for a tree leaning in an aft manner.

A plastic bushing 162 is then placed on top of tube 104 and the lower end of post 118 is extended downwardly therethrough. When the height of the seat has been properly adjusted, a retaining pin 164 is then inserted through the proper opening 126. The post 116 is then lowered until pin 164 rests on bushing 162. A retaining pin 166 is then extended through the opening 124 to prevent post 116 from disengaging from tube 104. The seat assembly 16 is thus rotatably mounted 360° with respect to platform 14 with the bushing 162 limiting any noise of movement of seat assembly 12. The 360° movement of seat assembly 12 enables the hunter to assume proper shooting positions regardless of the direction in which an animal approaches the tree stand. The offset nature of post 116 provides additional foot space for the hunter should he/she wish to stand as seen in FIG. 7. As previously stated, platform 14 is preferably circular in shape to provide the most area on which the hunter may place his/her feet when rotating the seat. However, platform 14 could be square, oval, rectangular, etc. Platform 14 is preferably constructed of metal but could be constructed of plastic, fiber reinforced plastic or other suitable materials.

Figure 8:
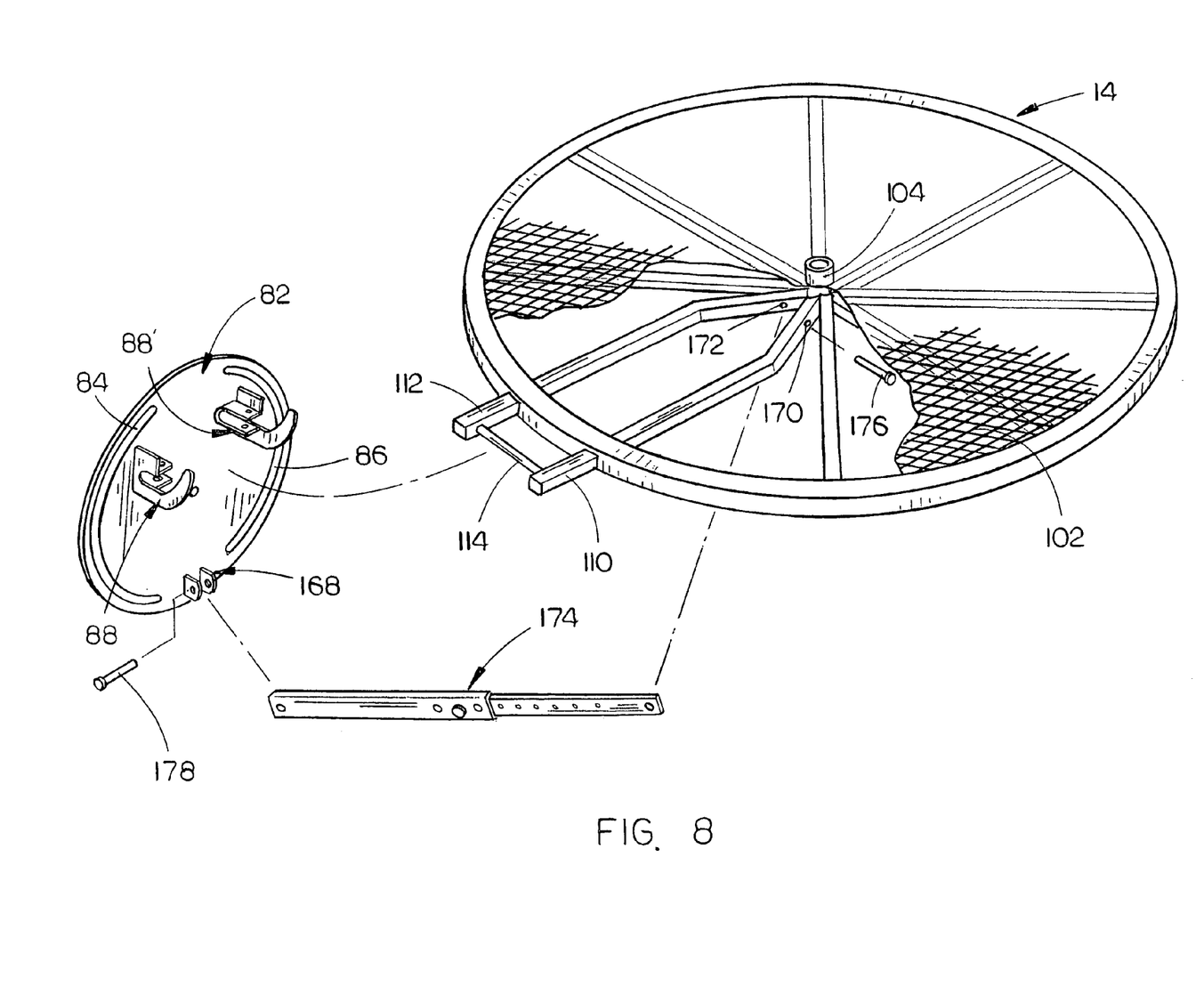
FIG. 8 is a partial exploded perspective view of a modified form of the tree stand.
Figure 9:
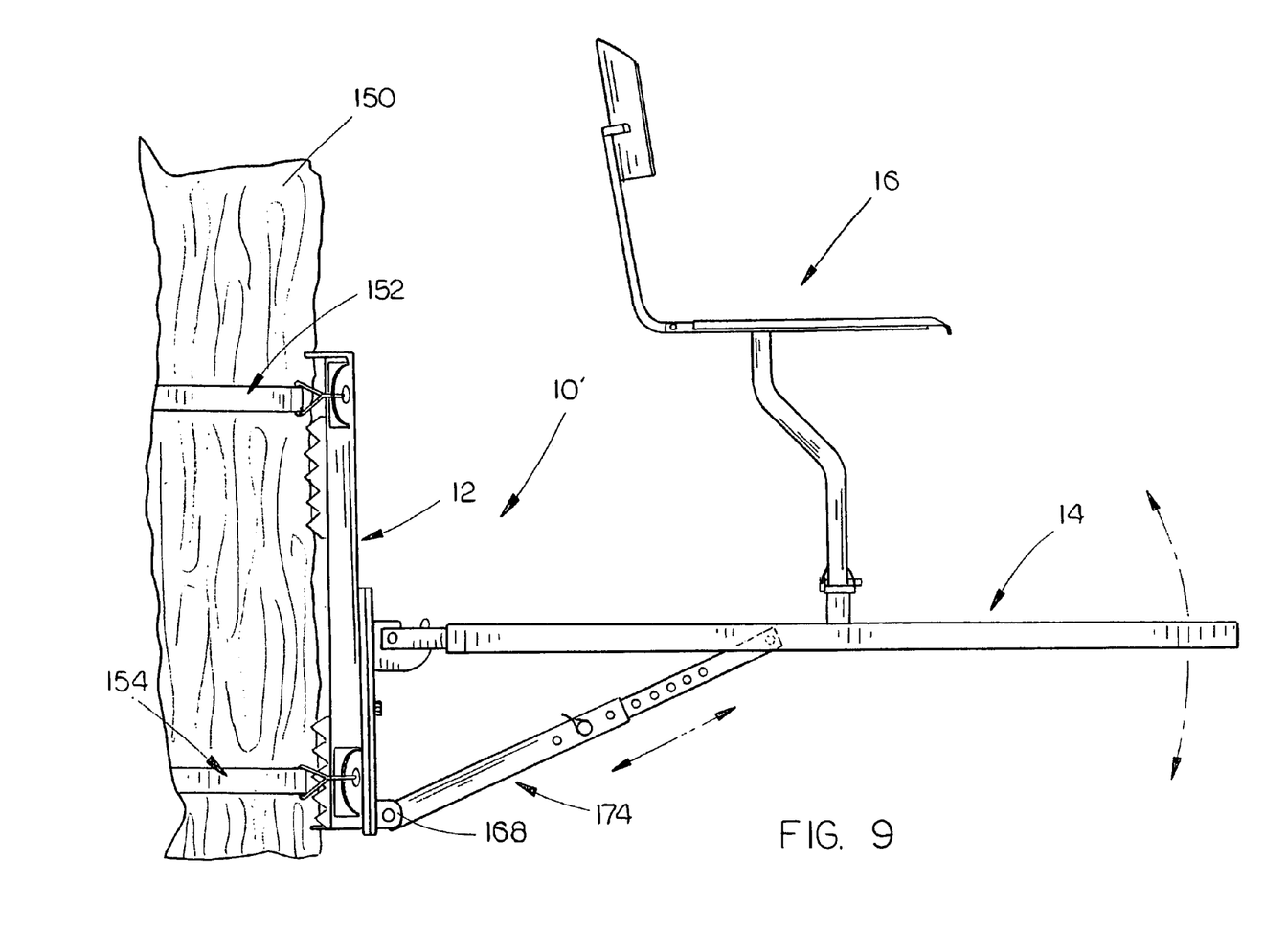
FIG. 9 is a side view of the modified tree stand of FIG. 8.

FIGS. 8 and 9 illustrate a modified form of the tree stand which is designated by the reference numeral 10'. The components of tree stand 10' are identical to the components of tree stand except for a few small changes. In tree stand 10', the hook supports 88 and 88' have been moved upwardly on the support plate 82 and a bracket 168 is secured to the lower end of support plate 82. The inner ends of frame members 110 and 112 have openings 170 and 172 formed therein with those openings being positioned below floor 102. The outer end of a length adjustable member 174 is pivotally secured to the inner ends of frame members 110 and 112 by means of retaining pin or bolt 176 extending through openings 170, the outer end of members 174 and opening 172. The inner end of length adjustable member 174 is pivotally secured to bracelet 168 by pin or bolt 178.

In summary, the only difference between tree stand 10 and 10' is that platform 14 in tree stand 10 is adjusted by a length adjustable member from above the platform and in tree stand 10'. The platform in tree stand 10' is adjusted by a length adjustable member from below the platform. Both tree stands 10 and 10' are able to be mounted on trees which are not vertically disposed but which may lean side-to-side or fore and aft.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A tree stand for attachment to a tree, comprising:
a generally rectangular first support having an upper end, a lower end, a first side edge, a second side edge, an inner side and an outer side;
means for attaching said first support to a tree whereby said inner side of said first support is positioned adjacent the tree;
a pivot member secured to said first support which extends transversely outwardly from said outer side of said first support;
a second support positioned at said outer side of said first support which is selectively pivotally mounted on said pivot member;
a platform selectively pivotally secured to said second support about an axis which is transverse to said pivot member;
a length adjustable connector member secured to and extending between said platform and said first support for positioning said platform in a generally horizontally disposed position;
an elongated, upstanding third support having upper and lower ends;
said third support being selectively rotatably secured at its said lower end to said platform and extending upwardly therefrom;
and a seat secured to said upper end of said third support;
said second support being generally disc-shaped and which has at least a pair of elongated arcuate slots formed therein;
said first support having a pair of spaced-apart bolt members secured thereto which extend therefrom into said slots of said second support for selectively positioning said second support member in various p6sitions with respect to said first support to compensate for different side-to-side tree angles.

2. A tree stand for attachment to a tree, comprising:
a generally rectangular first support having an upper end, a lower end, a first side edge, a second side edge, an inner side and an outer side;
means for attaching said first support to a tree whereby said inner side of said first support is positioned adjacent the tree;
a pivot member secured to said first support which extends transversely outwardly from said outer side of said first support;
a second support positioned at said outer side of said first support which is selectively pivotally mounted on said pivot member;
a platform selectively pivotally secured to said second support about an axis which is transverse to said pivot member;
a length adjustable connector member secured to and extending between said platform and said first support for positioning said platform in a generally horizontally disposed position;
an elongated, upstanding third support having upper and lower ends;
said third support being selectively rotatably secured at its said lower end to said platform and extending upwardly therefrom;
a seat secured to said upper end of said third support;
said first support including a disc-shaped member, having inner and outer sides, at said outer side;

said pivot member extending outwardly from said disc-shaped member;

said second support comprising a support plate, having inner and outer sides, positioned adjacent said outer side of said disc-shaped member.

3. The tree stand of claim 2 wherein said support plate has a pair of arcuate slots formed therein and wherein said disc-shaped member has a pair of threaded members extending outwardly therefrom through said arcuate slots for maintaining said support plate in various positions with respect to said disc-shaped member.

4. The tree stand of claim 3 wherein a pair of horizontally spaced-apart support hooks are secured to said outer side of said support plate and wherein said platform is pivotally secured to said support hooks.

5. The tree stand of claim 2 wherein said platform is pivotally secured to said support plate and wherein said length adjustable connector member has first and second ends and wherein said first end thereof is operatively connected to said platform and wherein said second end thereof is operatively connected to said support plate below the pivotal connection of said platform to said support plate.

6. The tree stand of claim 5 wherein said length adjustable connector member is comprised of a rigid material.

\* \* \* \* \*